(12) United States Patent
Yen et al.

(10) Patent No.: US 11,226,029 B2
(45) Date of Patent: Jan. 18, 2022

(54) GEARBOX WITH MOTOR FIXING STRUCTURE

(71) Applicant: Fairway Electronic Co., Ltd., New Taipei (TW)

(72) Inventors: Lin-Han Yen, New Taipei (TW); Chien-Hsiung Hsieh, New Taipei (TW); Yu-Jen Fang, New Taipei (TW)

(73) Assignee: FAIRWAY ELECTRONIC CO., LTD., New Taipei (TW)

( * ) Notice: Subject to any disclaimer, the term of this patent is extended or adjusted under 35 U.S.C. 154(b) by 213 days.

(21) Appl. No.: 16/562,997

(22) Filed: Sep. 6, 2019

(65) Prior Publication Data

US 2020/0309243 A1 Oct. 1, 2020

(51) Int. Cl.
| | |
|---|---|
| *F16H 57/021* | (2012.01) |
| *F16H 1/16* | (2006.01) |
| *F16H 1/28* | (2006.01) |
| *F16H 37/04* | (2006.01) |
| *F16H 57/039* | (2012.01) |
| *F16H 57/032* | (2012.01) |
| *F16H 57/02* | (2012.01) |
| *F16H 57/028* | (2012.01) |

(52) U.S. Cl.
CPC ............. *F16H 57/021* (2013.01); *F16H 1/16* (2013.01); *F16H 1/28* (2013.01); *F16H 37/041* (2013.01); *F16H 57/032* (2013.01); *F16H 57/039* (2013.01); *F16H 57/028* (2013.01); *F16H 2057/02034* (2013.01); *F16H 2702/02* (2013.01)

(58) Field of Classification Search
CPC . F16H 57/021; F16H 1/16; F16H 1/28; F16H 37/042; F16H 57/039; F16H 57/028; F16H 2057/02034; F16H 2702/02
See application file for complete search history.

(56) References Cited

U.S. PATENT DOCUMENTS

| | | | | |
|---|---|---|---|---|
| 3,831,701 | A * | 8/1974 | Pilon ...................... | B62D 5/008 180/407 |
| 4,693,425 | A * | 9/1987 | Meis ..................... | A01G 25/092 239/735 |
| 6,575,265 | B2 * | 6/2003 | Richardson ............ | B62D 5/008 180/444 |
| 6,918,314 | B2 * | 7/2005 | Wang ...................... | F16H 59/08 74/335 |
| 9,970,543 | B2 * | 5/2018 | Jeon ........................ | F16H 19/02 |
| 10,208,858 | B2 * | 2/2019 | Rodrigues ............... | B60T 1/062 |
| 10,234,028 | B2 * | 3/2019 | Jeon ........................ | F16H 61/32 |
| 2002/0104267 | A1 * | 8/2002 | Sato ....................... | E05F 11/445 49/350 |

(Continued)

*Primary Examiner* — Tinh Dang
(74) *Attorney, Agent, or Firm* — Muncy, Geissler, Olds and Lowe, P.C.

(57) ABSTRACT

A gearbox with motor fixing structure is used to fix a motor on the gearbox. The motor has a body and a shaft protruding from the leading edge of the body. The gearbox with motor fixing structure comprises a box and a metal part. The box has a gear set configured inside. An outer edge of a side wall of the box has a first hole. The metal part is configured inside the box. The motor is embedded in the first hole. The leading edge of the body of the motor is locked on the metal part, and the shaft of the motor passes through the metal part into the box to connect with the gear set.

9 Claims, 4 Drawing Sheets

(56) References Cited

U.S. PATENT DOCUMENTS

| | | | | |
|---|---|---|---|---|
| 2002/0115515 | A1* | 8/2002 | Giacomini | F16K 31/047 475/1 |
| 2007/0226939 | A1* | 10/2007 | Takada | B60S 1/06 15/250.31 |
| 2007/0234847 | A1* | 10/2007 | Takada | B60S 1/583 74/606 R |
| 2009/0284062 | A1* | 11/2009 | Sakai | B60N 2/0232 297/354.1 |
| 2015/0047443 | A1* | 2/2015 | Tseng | F16H 25/20 74/89.23 |
| 2017/0145873 | A1* | 5/2017 | Pluta | F01L 1/352 |

* cited by examiner

GEARBOX WITH MOTOR FIXING STRUCTURE

RELATED APPLICATIONS

The present application claims the priority of Taiwan Application No. 108203792, filed Mar. 28, 2019, the disclosure of which is hereby incorporated by reference herein in its entirety.

BACKGROUND OF THE INVENTION

1. Field of the Invention

The present disclosure generally relates to a gearbox with motor fixing structure, and, more particularly, to a gearbox that uses a metal piece to connect the motor, and then uses a upper casing and a lower casing to engage and clamp the metal piece to fix the motor.

2. Description of the Related Art

Handheld machine tools, such as polishing machines or waxing machines, mainly include the internal components of a motor plus a gearbox according to the mechanism design. When designing the component configuration of the internal mechanism of the handheld machine tools, designers usually need to consider some issues, like temperature, stability, strength of the system and running noise. Since the motor shaft is connected to the gear set inside of the gearbox, the vibration produced by the motor during the operation itself will affect the structural stability inside the gearbox and the temperature will rise caused by the operation of the gear set.

Furthermore, some designers of handheld machine tools on the market replace the gear set materials from metal to plastic materials to reduce the noise and the heat during the operation. However, the structure containing both plastic components and metal components may result in poor structural strength when the plastic gear set and the metal motor are assembled.

Therefore, how to improve the internal structure of the current gearbox to overcome the poor structural strength of the motor gearbox configured with plastic gear set and metal motor is a problem still to be solved in the industry.

SUMMARY OF THE INVENTION

The present inventive concept provides a gearbox with motor fixing structure used to fix a motor on the gearbox. The motor has a body and a shaft protruding from the leading edge of the body. The gearbox with motor fixing structure comprises a box having a gear set configured inside, wherein an outer edge of a side wall of the box has a first hole; and a metal part configured inside the box, wherein the motor is embedded in the first hole, the leading edge of the body of the motor is locked on the metal part, and the shaft of the motor passes through the metal part into the box to connect with the gear set.

In an exemplary embodiment, the box comprises there inside a first space and a second space. The gear set comprises a worm and an epicyclic gear set engaged with the worm. The worm is disposed in the first space, and the epicyclic gear set is disposed in the second space.

In an exemplary embodiment, the box and the gear set are made of plastic material.

In an exemplary embodiment, the metal part is a U-shaped structure and disposed in the first space. The metal part has a first passing hole at one end and a second passing hole aligned with the first passing hole at the other end, and the shaft of the motor passes through the first passing hole and the second passing hole to connect with the worm.

In an exemplary embodiment, the metal part has an opening, and the shaft of the motor passes through the opening to connect with the worm.

In an exemplary embodiment, the gearbox further comprises a partition wall and the first space further comprising a first accommodating portion and a second accommodating portion, wherein the partition wall is disposed in the first space inside the box. The partition wall is used to separate the first space to form the first accommodating portion and the second accommodating portion, and the worm is disposed in the first accommodating portion and the second accommodating portion is used to accommodate the metal part.

In an exemplary embodiment, the second accommodating portion has a groove and the metal part further has a convex portion. The convex portion is inserted into the groove, so that the metal part is fixed to the second accommodating portion.

In an exemplary embodiment, the partition wall has a second hole, and the shaft of the motor passes through the metal part and the second hole to connect with the worm.

In an exemplary embodiment, the box comprises an upper casing and a lower casing. The upper casing and the lower casing can be joined together to form the box.

In an exemplary embodiment, the partition wall comprises an upper partition wall and a lower partition wall, which are respectively disposed on the upper casing and the lower casing. The upper partition wall and the lower partition wall are joined together to form the partition wall.

In an exemplary embodiment, the gearbox further comprises a second convex portion disposed on the upper casing. The second convex portion is configured along the edge of the upper casing and extending to the end surface of the upper partition wall.

In an exemplary embodiment, the lower casing is extending to a side wall of the first space, and the end surface of the lower partition wall is configured with a stepped structure corresponding to the shape of the second convex portion.

In an exemplary embodiment, the gearbox further comprises a plurality of screws. The metal part further has a plurality of through holes. The leading edge of the body of the motor has a plurality of threaded holes corresponding to the through holes, and the screws pass through the through holes and thread into the threaded holes, so that the motor is fixed to the metal part.

In summary, the gearbox with motor fixing structure according to the present inventive concept has the motor fixed on the metal part, and the metal part with the motor fixed thereon is further embedded in the gearbox to fasten the motor to the gearbox, thereby increasing the structural strength and reducing the temperature rise and noise caused by the gear set driven by the motor.

BRIEF DESCRIPTION OF THE DRAFLAPS

FIG. 2-1 to FIG. 2-2 are schematic exploded views of the box of the gearbox with motor fixing structure according to the present inventive concept;

FIG. 3-1 to FIG. 3-2 are schematic views of the upper and lower casings of the gearbox with motor fixing structure according to the present inventive concept;

DETAILED DESCRIPTION

The present inventive concept is described by the following specific embodiments. Those with ordinary skills in the arts can readily understand other advantages and functions of the present inventive concept after reading the disclosure of this specification. Any changes or adjustments made to their relative relationships, without modifying the substantial technical contents, are also to be construed as within the range implementable by the present inventive concept.

Figure 1:
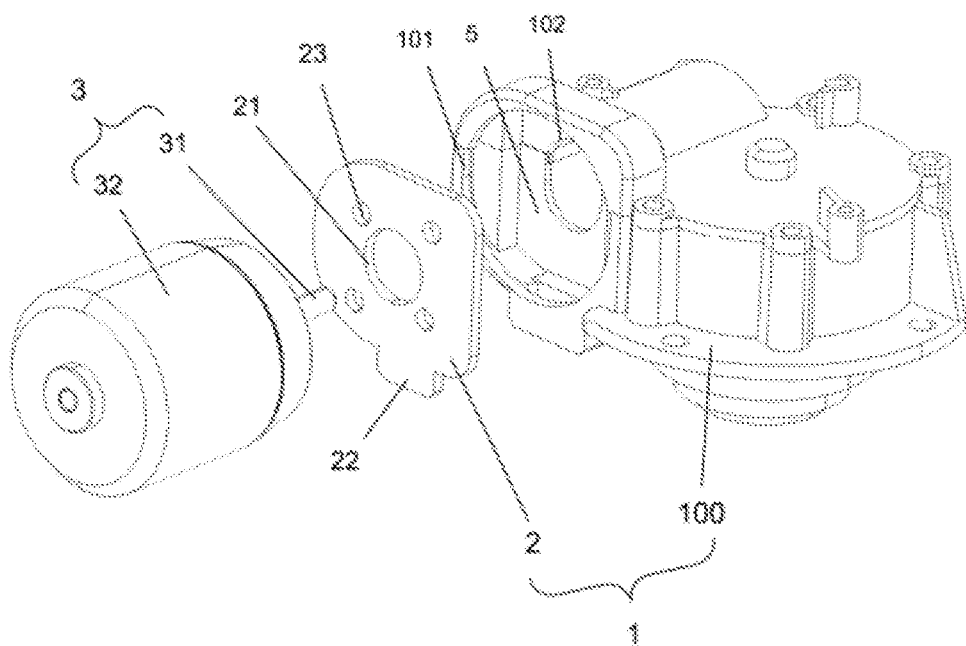
FIG. 1-1 to FIG. 1-2 are components schematic views of the gearbox with motor fixing structure according to the present inventive concept.
Figures 1, 2:
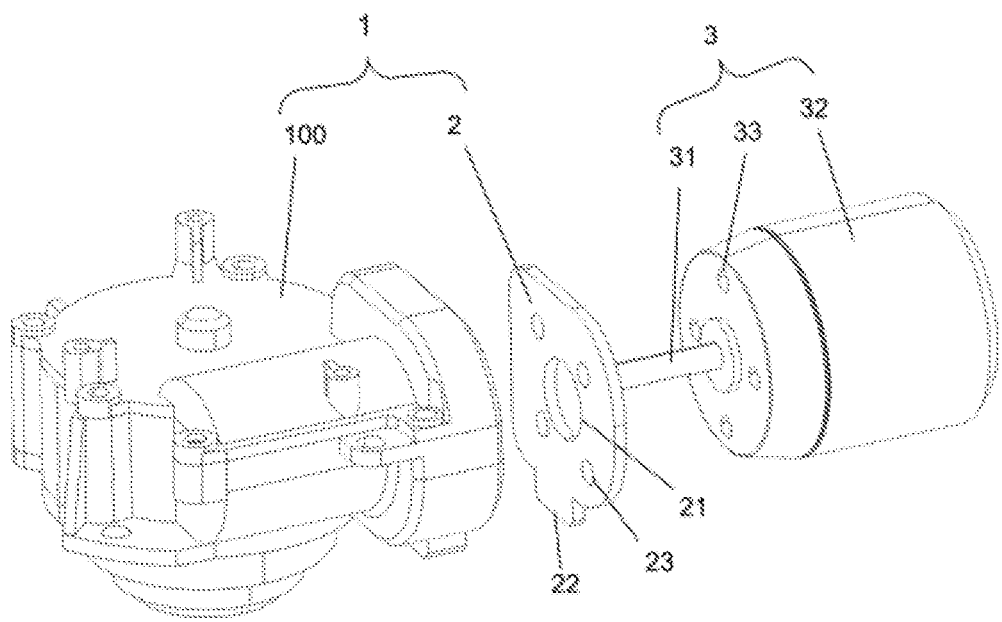
Figures 1, 2:
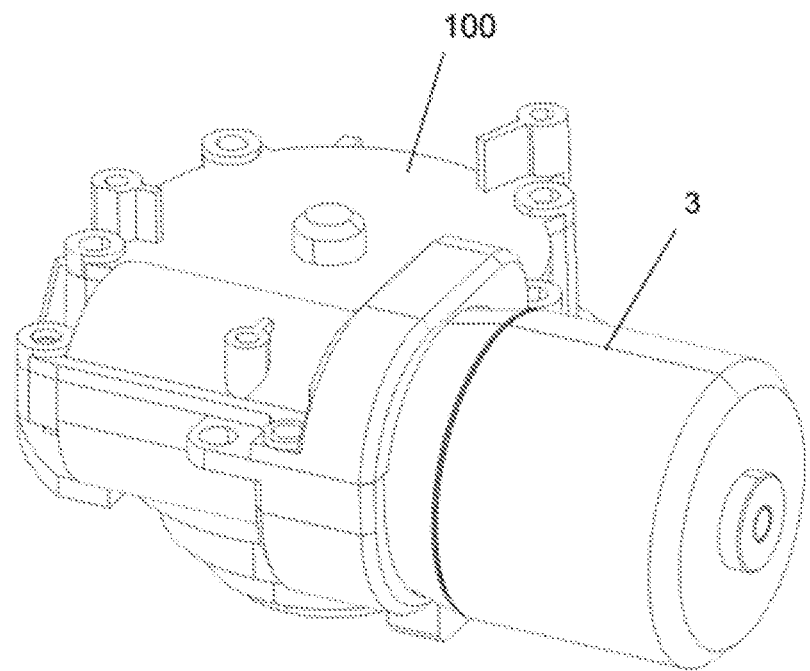
Figure 2:
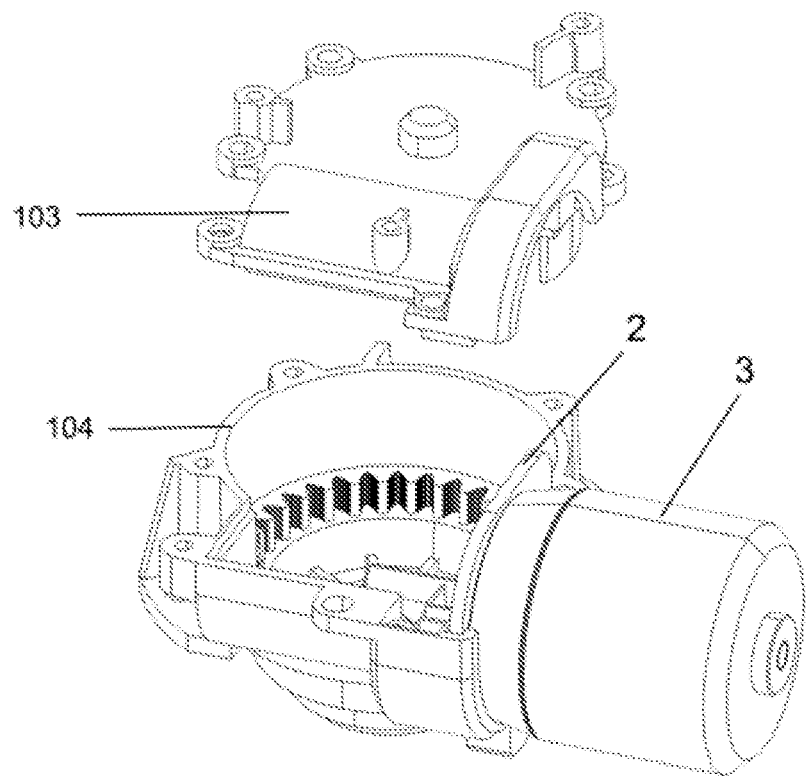

Please refer to FIG. 1-1 and FIG. 1-2. They are components schematic views of the gearbox with motor fixing structure according to the present inventive concept. The gearbox 1 with motor fixing structure according to the present inventive concept can be mainly used to fix a motor 3 on the gearbox 1. The motor 3 may have a body 32 and a shaft 31 protruding from the leading edge of the body 32. The gearbox 1 may comprise a box 100 and a metal part 2. A gear set may be configured inside the box 100. The metal part 2 may be embedded in the box 100. An outer edge of a side wall of the box 100 may have a first hole 101, and the motor 3 may be embedded in the first hole 101. Please refer to FIG. 2-1 and FIG. 2-2. They are schematic exploded views of the box of the gearbox with motor fixing structure according to the present inventive concept. The box 100 may comprise an upper casing 103 and a lower casing 104 which can be joined together to form the box 100. FIG. 2-2 also shows the structure in which the components are disposed inside the casing 100 after the casing 100 is exploded. The metal part 2 may have an opening 21. When the shaft 31 of the motor 3 passes through the metal part 2 into the box 100, the shaft 31 will pass through the opening 21 to connect with the gear set. The leading edge of the body 32 is locked on the metal part 2. Except for the motor 3, the box 100 and the gear set according to the present inventive concept may be made of a plastic material to effectively reduce the temperature rise and noise generated by the gear set driven by the motor 3. In order to improve the structural strength of the gearbox configured with a plastic box and a metal motor, the present inventive concept provides a gearbox that the motor 3 is fixed to the metal part 2 and the metal part 2 with fixed motor 3 thereon is further embedded in the box 100 to fasten the motor 3.

Figures 1, 3:
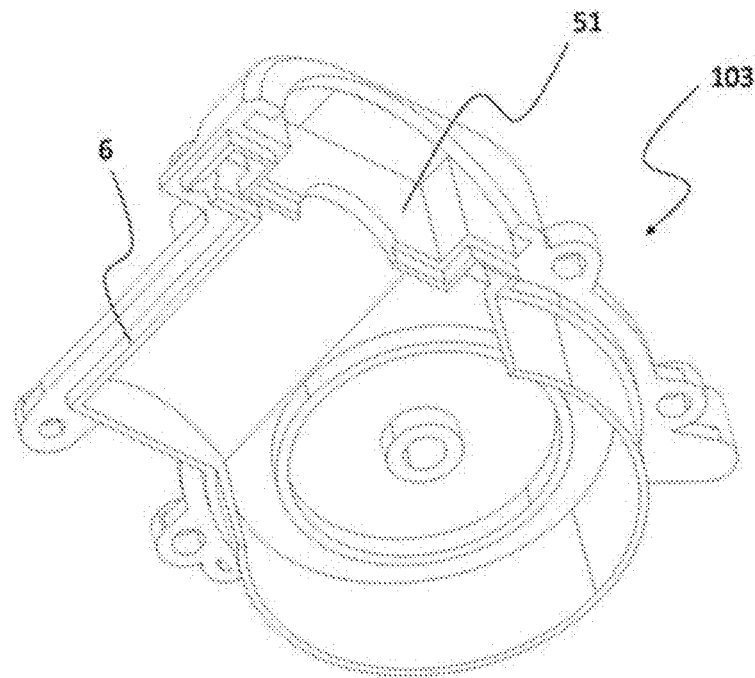
Figures 2, 3:
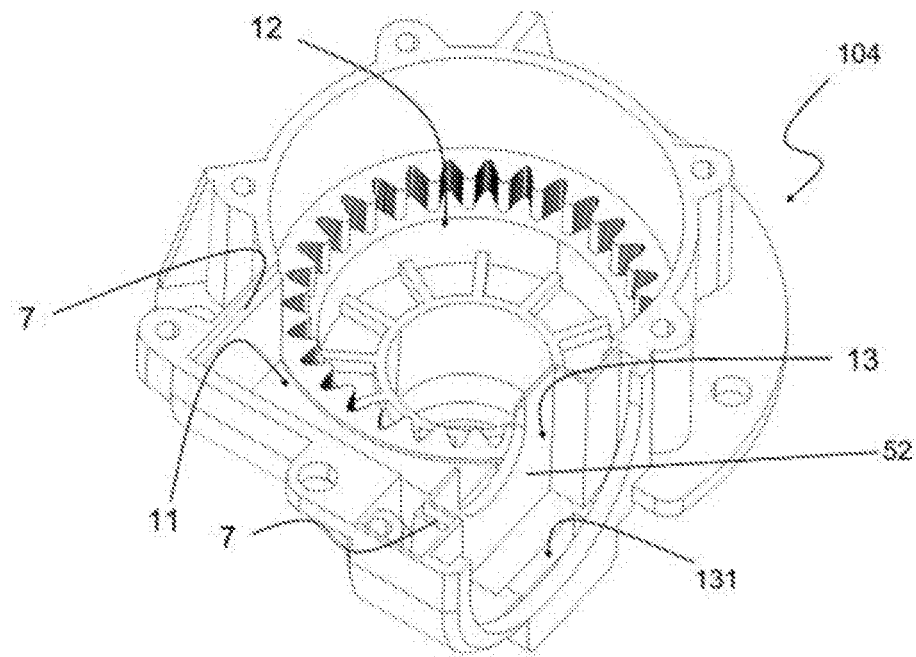
Figure 4:
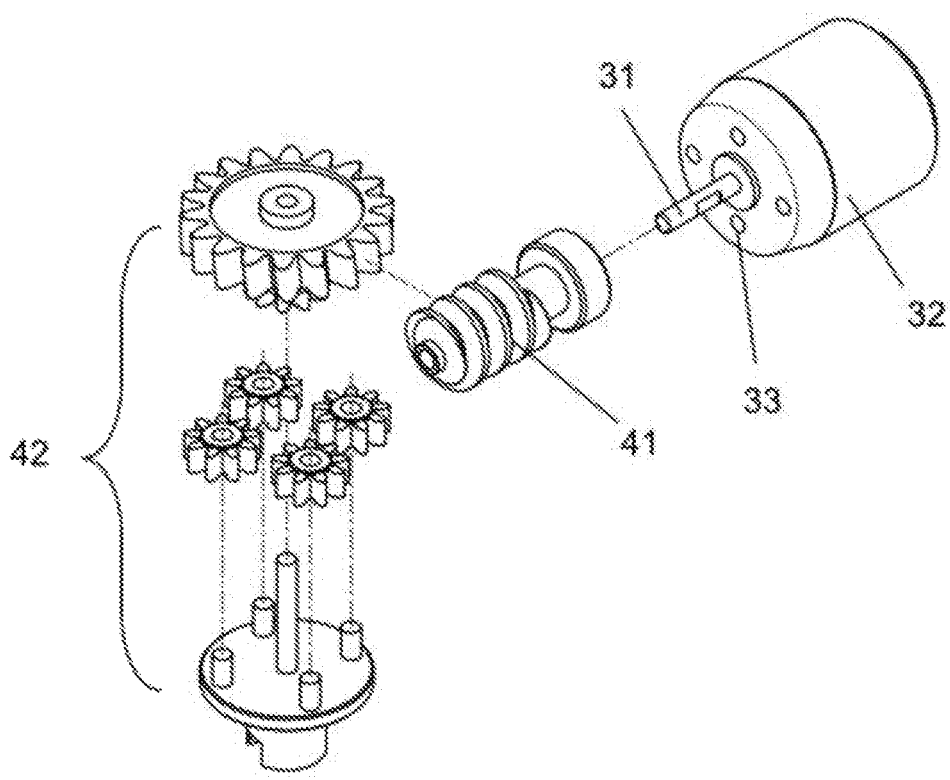
FIG. 4 is a structure schematic view of the gear set of the gearbox with motor fixing structure according to the present inventive concept.

Please refer to FIG. 3-1, FIG. 3-2 and FIG. 4. FIG. 3-1 to FIG. 3-2 are schematic views of the upper and lower casings of the gearbox with motor fixing structure according to the present inventive concept. FIG. 4 is a structure schematic view of the gear set of the gearbox with motor fixing structure according to the present inventive concept. The box 100 may comprise there inside a first space (not referenced in the figures) and a second space 12. The gear set may comprise a worm 41 and an epicyclic gear set 42 engaged with the worm 41. The worm 41 may be disposed in the first space, and the epicyclic gear set 42 may be disposed in the second space 12. The shaft 31 of the motor 3 may pass through the opening 21 of the metal part 2 to connect with the worm 41.

The gearbox with motor fixing structure according to the present inventive concept may further comprise a partition wall 5 disposed in the first space inside the box 100. The first space further comprising a first accommodating portion 11 and a second accommodating portion 13. The partition wall 5 may separate the first space to form the first accommodating portion 11 and the second accommodating portion 13. The worm 41 may be disposed in the first accommodating portion 11. The second accommodating portion 13 is used to accommodate the metal part 2. The box 100 is manufactured by plastic injection molding, so the second accommodating portion 13 can conform to the shape of the metal part 2. Thus, the periphery of the metal part 2 can also contact the inside of the box 100 when the metal part 2 is embedded in the second accommodating portion 13. By doing so, the metal part 2 can embedded inside the box 100 more firmly. Furthermore, the second accommodating portion 13 may have a groove 131 and the metal part 2 may further have a convex portion 22. When the metal part 2 is disposed in the second accommodating portion 13, the convex portion 22 will be inserted into the groove 131, so that the metal part 2 is fixed to the second accommodating portion 13. In addition, the partition wall 5 may have a second hole 102. The shaft 31 of the motor 3 may pass through the metal part 2 and then pass through the second hole 102 to connect with the worm 41, as shown in FIG. 1-1.

Please refer to FIG. 3-1 and FIG. 3-2. According to the upper casing 103 and the lower casing 104, the partition wall 5 can comprise upper partition wall 51 and a lower partition wall 52, which may be respectively disposed on the upper casing 103 and the lower casing 104. The upper partition 51 wall and the lower partition wall 52 may be joined together to form the partition wall 5. The gearbox 1 with motor fixing structure according to the present inventive concept may further comprise a second convex portion 6 disposed on the upper casing 103. The second convex portion 6 may be configured along the edge of the upper casing 103 and extending to the end surface of the upper partition wall 51. The gearbox with motor fixing structure of the present inventive concept may further comprise a stepped structure 7. In another preferable embodiment, the stepped structure 7 may be configured alone the inner surface of a side wall of the first accommodating portion 11 and the stepped structure 7 may further extend to be disposed on the inner surface of the lower partition wall 52, and wherein the inner surface of the lower partition wall 52 may face the first accommodating portion 11. Preferably, the stepped structure 7 may further substantially surround the first accommodation portion 11. The stepped structure 7 may be corresponding to the shape of the second convex portion 6. When the upper and lower casings are joined together, the second convex portion 6 may be engaged with the stepped structure 7 at the first accommodating portion 11 and the second accommodating portion 13 of the box 100, and the second convex portion 6 may be engaged with the inner edge of the side wall of the lower casing 104 at the second space 12 of the box 100. The design of the second convex portion 6 can enhance the stability of the joint when the upper and lower casings are engaged, to increase the structural strength of the box 100.

In an exemplary embodiment according to the present inventive concept, the gearbox with motor fixing structure may further comprise a plurality of screws (not shown in the figures). The metal part 2 may further have a plurality of through holes 23 corresponding to the number of screws.

The leading edge of the body 32 of the motor 3 may also have a plurality of threaded holes 33 corresponding to the through holes 23, as shown in FIG. 1-2. The motor 3 can be fixed to the metal part 2 by the screws passing through the through holes 23 and the threaded holes 33.

Figure 5:
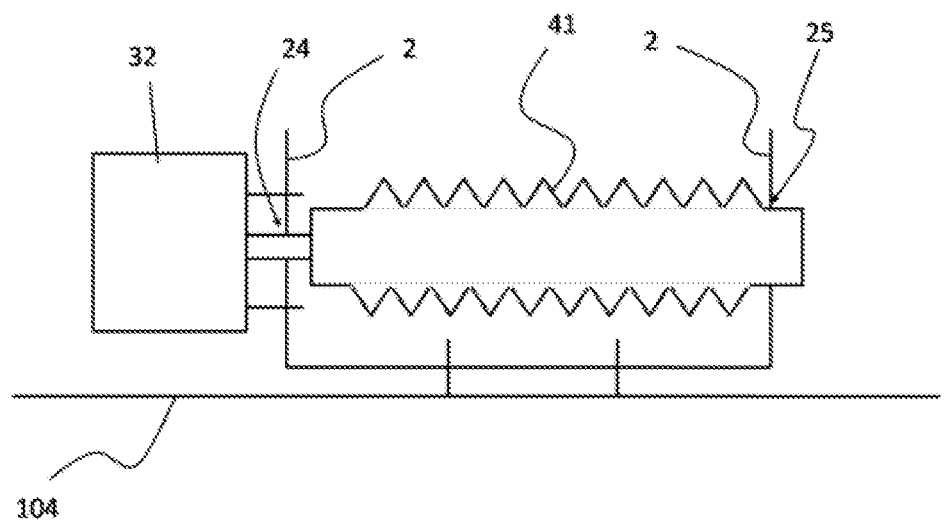
FIG. 5 is a schematic view of the gearbox with motor fixing structure according to the present inventive concept in another exemplary embodiment.

It should be noted that the embodiments provided by the present invention are for illustrative purposes only and are not intended to limit the connection between the metal part 2 and the motor 3. In other words, as long as the motor 3 is fasten on the gearbox by fixing the motor 3 to the metal part 2 and then embedding the metal part 2 inside the box 100, it should be covered by scope of the technical contents disclosed in the present invention, no matter by what means the metal part 2 and the motor 3 are connected. In another exemplary embodiment according to the present inventive concept, as shown in FIG. 5, demonstrate another means to fix the motor on the metal part. The metal part 2 is a U-shaped structure and fixed to the bottom of the lower casing 104 to be embedded inside the box 100. Since the volume of the U-shaped metal part is larger, it may extend to the first accommodating portion 11 when being configured in the box. The metal part 2 may have a first passing hole 24 at one end and a second passing hole 25 aligned with the first passing hole 24 at the other end. The worm 41 may pass through the first through hole 24. The shaft 31 of the motor 3 may pass through the first passing hole 24 to connect with the worm 41, then the worm 41 may pass through the second passing hole 25.

In summary, the present inventive concept provides a gearbox with motor fixing structure, wherein the motor connects to a metal part, such as an iron piece, first, then the metal part with the motor thereon is embedded inside the gearbox. This structure increases the structural strength when the gearbox and motor are assembled together to avoid the effect of the material of the gearbox. In this structure, the box and the internal gear set connected to the motor of the gearbox can be made of metal material instead of plastic material. It not only lightens the handheld machine tool, but also reduces the temperature rise and noise caused by the gearbox driven by the motor.

The foregoing descriptions of the detailed embodiments are only illustrated to disclose the features and functions of the present inventive concept and not restrictive of the scope of the present inventive concept. It should be understood to those in the art that all modifications and variations according to the spirit and principle in the disclosure of the present inventive concept should fall within the scope of the appended claims.

What is claimed is:

1. A gearbox with motor fixing structure used to fix a motor on the gearbox, the motor having a body and a shaft protruding from the leading edge of the body, the gearbox with motor fixing structure comprising:
    a box having a gear set configured inside, an outer edge of a side wall of the box has a first hole, wherein the box comprises thereinside a first space and a second space, the gear set comprises a worm and an epicyclic gear set engaged with the worm, wherein the worm is disposed in the first space, and the epicyclic gear set is disposed in the second space; and
    a metal part configured inside the box, wherein the motor is embedded in the first hole, the leading edge of the body of the motor is locked on the metal part, and the shaft of the motor passes through the metal part into the box to connect with the gear set, wherein the metal part has an opening, and the shaft of the motor passes through the opening to connect with the worm,
    a partition wall disposed in the first space inside the box, wherein the first space further comprising a first accommodating portion and a second accommodating portion, wherein the partition wall is used to separate the first space to form the first accommodating portion and the second accommodating portion, and the worm is disposed in the first accommodating portion and the second accommodating portion is used to accommodate the metal part, wherein the second accommodating portion has a groove and the metal part further has a convex portion, and wherein the convex portion is inserted into the groove, so that the metal part is fixed to the second accommodating portion.

2. The gearbox with motor fixing structure of claim 1, wherein the box and the gear set are made of plastic material.

3. The gearbox with motor fixing structure of claim 1, wherein the metal part is a U-shaped structure and disposed in the first space, the metal part has a first passing hole at one end and a second passing hole aligned with the first passing hole at the other end, and the shaft of the motor passes through the first passing hole and the second passing hole to connect with the worm.

4. The gearbox with motor fixing structure of claim 1, wherein the partition wall has a second hole, and the shaft of the motor passes through the metal part and the second hole to connect with the worm.

5. The gearbox with motor fixing structure of claim 1, wherein the box comprises an upper casing and a lower casing, wherein the upper casing and the lower casing are joined together to form the box.

6. The gearbox with motor fixing structure of claim 5, wherein the partition wall comprises an upper partition wall and a lower partition wall, which are respectively disposed on the upper casing and the lower casing, wherein the upper partition wall and the lower partition wall are joined together to form the partition wall.

7. The gearbox with motor fixing structure of claim 6, further comprising a second convex portion disposed on the upper casing, wherein the second convex portion is configured along the edge of the upper casing and extending to the end surface of the upper partition wall.

8. The gearbox with motor fixing structure of claim 7, further comprising a stepped structure configured alone the inner surface of a side wall of the first accommodating portion and extending to be disposed on the inner surface of the lower partition wall, wherein the stepped structure corresponds to the shape of the second convex portion.

9. The gearbox with motor fixing structure of claim 1, further comprising a plurality of screws, and the metal part further has a plurality of through holes, the leading edge of the body of the motor has a plurality of threaded holes corresponding to the through holes, wherein the screws pass through the through holes and thread into the threaded holes, so that the motor is fixed to the metal part.

\* \* \* \* \*